(12) United States Patent
Carlet et al.

(10) Patent No.: US 10,648,651 B2
(45) Date of Patent: May 12, 2020

(54) ILLUMINATION SYSTEM WITH TRANSPORTATION SYSTEM

(71) Applicant: LYM S.R.L., Sacile (PN) (IT)

(72) Inventors: Pietro Valerio Carlet, Sacile (IT); Gianni Deplano, Sacile (IT)

(73) Assignee: LYM S.R.L., Sacile (PN) (IT)

( * ) Notice: Subject to any disclaimer, the term of this patent is extended or adjusted under 35 U.S.C. 154(b) by 175 days.

(21) Appl. No.: 15/888,411

(22) Filed: Feb. 5, 2018

(65) Prior Publication Data

US 2018/0156429 A1 Jun. 7, 2018

Related U.S. Application Data

(63) Continuation-in-part of application No. PCT/IB2017/054779, filed on Aug. 4, 2017.

(30) Foreign Application Priority Data

Aug. 5, 2016 (IT) .......................... 102016000083187

(51) Int. Cl.
*F21V 21/34* (2006.01)
*F21V 21/02* (2006.01)
(Continued)

(52) U.S. Cl.
CPC .............. *F21V 21/34* (2013.01); *B32B 13/00* (2013.01); *B32B 15/04* (2013.01); *B32B 29/002* (2013.01);
(Continued)

(58) Field of Classification Search
CPC .. F21V 21/005; F21V 21/096; F21V 21/0965; F21V 21/15; F21V 21/34; F21V 23/045; F21S 8/068; A63H 29/22; A63H 30/04; A63H 33/005; A63H 33/22; F21L 4/08; F21W 2131/30; F21W 2131/402; F21W 2131/406; F21W 2131/407; B32B 2307/208; B62D 57/024; H02J 50/10; H02J 50/20; H02J 7/025
See application file for complete search history.

(56) References Cited

U.S. PATENT DOCUMENTS

2005/0243549 A1* 11/2005 Ruston ...................... F21S 2/00
    362/233
2010/0253282 A1* 10/2010 Azancot .................. H02J 7/025
    320/108

(Continued)

FOREIGN PATENT DOCUMENTS

CN         10433577      5/2015
DE         9102685       5/1991
(Continued)

*Primary Examiner* — Anh T Mai
*Assistant Examiner* — Steven Y Horikoshi
(74) *Attorney, Agent, or Firm* — King & Schickli, PLLC

(57) ABSTRACT

The present invention relates to an illumination system (100) comprising at least one illumination device (1) comprising a casing (2) wherein at least one light source (3) suitable for illuminating is housed, at least a power receptor (10) and at least an electronic board (9) adapted to receive, elaborate and transmit data. Moreover, said illumination system (100) also comprises at least one command interface (80A, 80B) adapted to communicate with said electronic board (9) of said at least one illumination device (1).

18 Claims, 11 Drawing Sheets

(51) Int. Cl.
*F21V 21/06* (2006.01)
*F21V 21/096* (2006.01)
*F21V 23/06* (2006.01)
*F21V 23/04* (2006.01)
*F21V 23/02* (2006.01)
*H02J 50/10* (2016.01)
*H01F 38/14* (2006.01)
*B32B 13/00* (2006.01)
*B32B 15/04* (2006.01)
*B32B 29/00* (2006.01)
*F21V 21/15* (2006.01)
*F21S 2/00* (2016.01)
*F21S 8/06* (2006.01)
*E04C 2/26* (2006.01)
*G06F 3/0484* (2013.01)
*F21Y 115/15* (2016.01)

(52) U.S. Cl.
CPC ............. *F21S 2/00* (2013.01); *F21S 8/068* (2013.01); *F21V 21/096* (2013.01); *F21V 21/15* (2013.01); *F21V 23/02* (2013.01); *F21V 23/045* (2013.01); *F21V 23/0435* (2013.01); *F21V 23/06* (2013.01); *H01F 38/14* (2013.01); *H02J 50/10* (2016.02); *B32B 2250/05* (2013.01); *B32B 2307/208* (2013.01); *E04C 2/26* (2013.01); *F21Y 2115/15* (2016.08); *G06F 3/04847* (2013.01)

(56) References Cited

U.S. PATENT DOCUMENTS

| | | | |
|---|---|---|---|
| 2014/0238762 A1* | 8/2014 | Berberian | G05D 1/0038 180/167 |
| 2015/0035639 A1* | 2/2015 | Nakamura | H01F 17/0033 336/200 |
| 2015/0224941 A1 | 8/2015 | Bernstein et al. | |
| 2015/0354788 A1 | 12/2015 | Huang et al. | |
| 2016/0018092 A1 | 1/2016 | Knaapen et al. | |

FOREIGN PATENT DOCUMENTS

| | | |
|---|---|---|
| DE | 20004356 U1 | 5/2000 |
| EP | 0493297 A2 | 7/1992 |
| JP | 2011204145 A | 10/2011 |
| WO | WO2015153812 | 10/2015 |

* cited by examiner

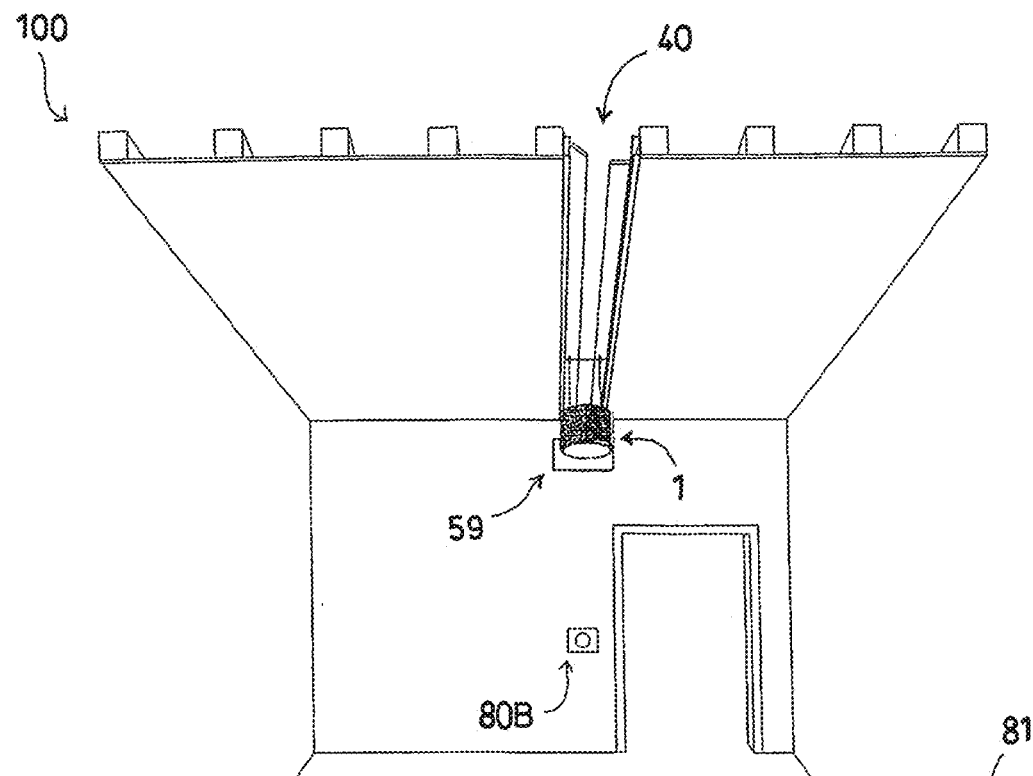
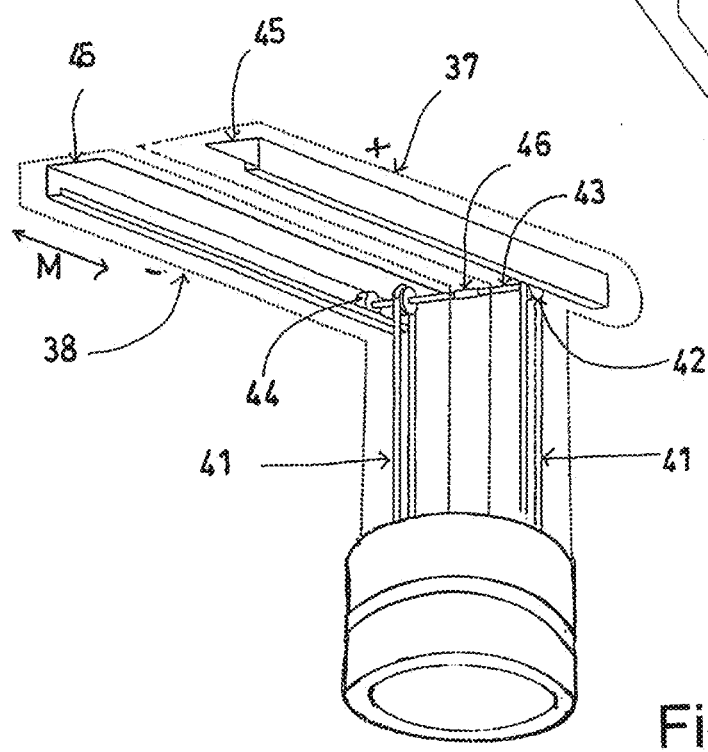

ILLUMINATION SYSTEM WITH TRANSPORTATION SYSTEM

FIELD OF THE INVENTION

This invention relates to an illumination system that includes at least one illumination device, that can be moved or that can move autonomously on a support surface, that could be for example a ceiling, a vertical wall or a floor of a residential, civilian or industrial space, also through the use of specific structures.

BACKGROUND ART

In line with human evolution, people's everyday life is experiencing a radical change, that nowadays, more than ever, needs a smart and advanced illumination system able to adapt itself to the new life rhythms and to the different spaces where people live their personal and professional dimension.

So far global construction industry has not been able to face and solve the common technical problem consisting in spotlights distribution inside homes, offices, factories and civilian infrastructures like schools, museums and hospitals.

Currently the spotlights are decided and defined at the beginning, so during the construction of the building. But this approach is no longer adequate to a world that is living a dynamic era, experiencing a continuous and constant change; a change that has necessarily to turn into renewed, flexible, dynamic and malleable construction principles.

Apartments, houses, schools, factories, offices and hospitals need an illumination system that allows its users to reposition and reshape the entire illumination easily, immediately and intuitively, basing on eventual change in use that they might experience during the day or on a medium-long basis.

SUMMARY OF THE INVENTION

A purpose of this invention is exceeding the problems and the limits of the above mentioned state of the art, proposing an illumination system comprising at least one illumination device able to move autonomously or to be moved on a support surface, combining user-friendliness, efficacy and functionality.

Following this purpose, one of the scopes of this invention consists in providing an illumination system able to rationalise the number of illumination devices to be used, allowing them to be positioned, case-by-case, in order to obtain the desired configuration.

Another purpose of this invention is providing a cost-efficient illumination system, conveniently installable with known and usual systems, machineries and tools.

The purpose and the scopes above indicated and others that will be indicated below, are achieved by an illumination system as defined in claim 1.

In an illumination system (100) according to a particular embodiment of the invention, at least one illumination device (1) of said illumination system (100) further comprises at least one battery (6). In an illumination system (100) according to a particular embodiment of the invention, said illumination device (1) further comprises at least one magnet (4) housed inside said casing (2). In an illumination system (100) according to a particular embodiment of the invention, the position of said at least one magnet (4) is adjustable by means of fixing and adjusting means (11) so as to adjust the intensity of the magnetic force of said at least one magnet (4) on the outside of said casing (2).

In an illumination system (100) according to a particular embodiment of the invention, said illumination device (1) comprises a plurality of magnetic sensors (12) adapted to detect the presence of ferromagnetic material on said support surface and a magnet attraction force sensor (13) adapted to detect that the intensity of said magnet (4) is suitable for interacting with said support structure (50).

According to a particular embodiment of the invention, said illumination system (100) further comprises at least a levitation base (70) provided with an electromagnet arranged so as to generate a force which is opposite to the magnetic force of said magnet (4) in order to allow the levitation of said illumination device (1).

In an illumination system (100) according to a particular embodiment of the invention, said illumination device (1) further comprises one or more of the following bearings accommodated in at least one hollowed or drilled housing (7A) obtained on a portion of said casing (2) adapted to be arranged, in use, in correspondence of a support surface of said illumination device (1): spherical bearings, (7), sliding blocks, friction pads or a plurality of spherical bearings (7).

In an illumination system (100) according to a particular embodiment of the invention, said illumination device (1) is equipped with a plurality of sensors (8) arranged on the surface of said casing (2) and associated to said at least one electronic board (9), said sensors (8) being suitable for detecting instantaneously or however in real time objects of any kind in proximity of said illumination device (1). In an illumination system (100) according to a particular embodiment of the invention, said power receptor (10) of a first illumination device (1) is adapted to cooperate with a correspondent power receptor (10) provided on a second illumination device (1) for charging in series at least said first and said second illumination device (1).

BRIEF DESCRIPTION OF THE DRAWINGS

Benefits and characteristics of this invention will be highlighted in the following description, as an example but not limited to, with reference to the attached drawings including:

FIGS. 4A and 4B show a prospective view of another particular embodiment of an illumination system in accordance with this invention;

DETAILED DESCRIPTION

Referring to the attached figures, an illumination system 100 under the present invention is shown, comprising at least one illumination device 1, advantageously equipped with suitable means in order to move it manually or through automatic movement on a support surface.

Preferably, said illumination system 100 includes a plurality of modular illumination devices 1 and, where appropriate, a support structure 30, 40, 50.

Figure 1:
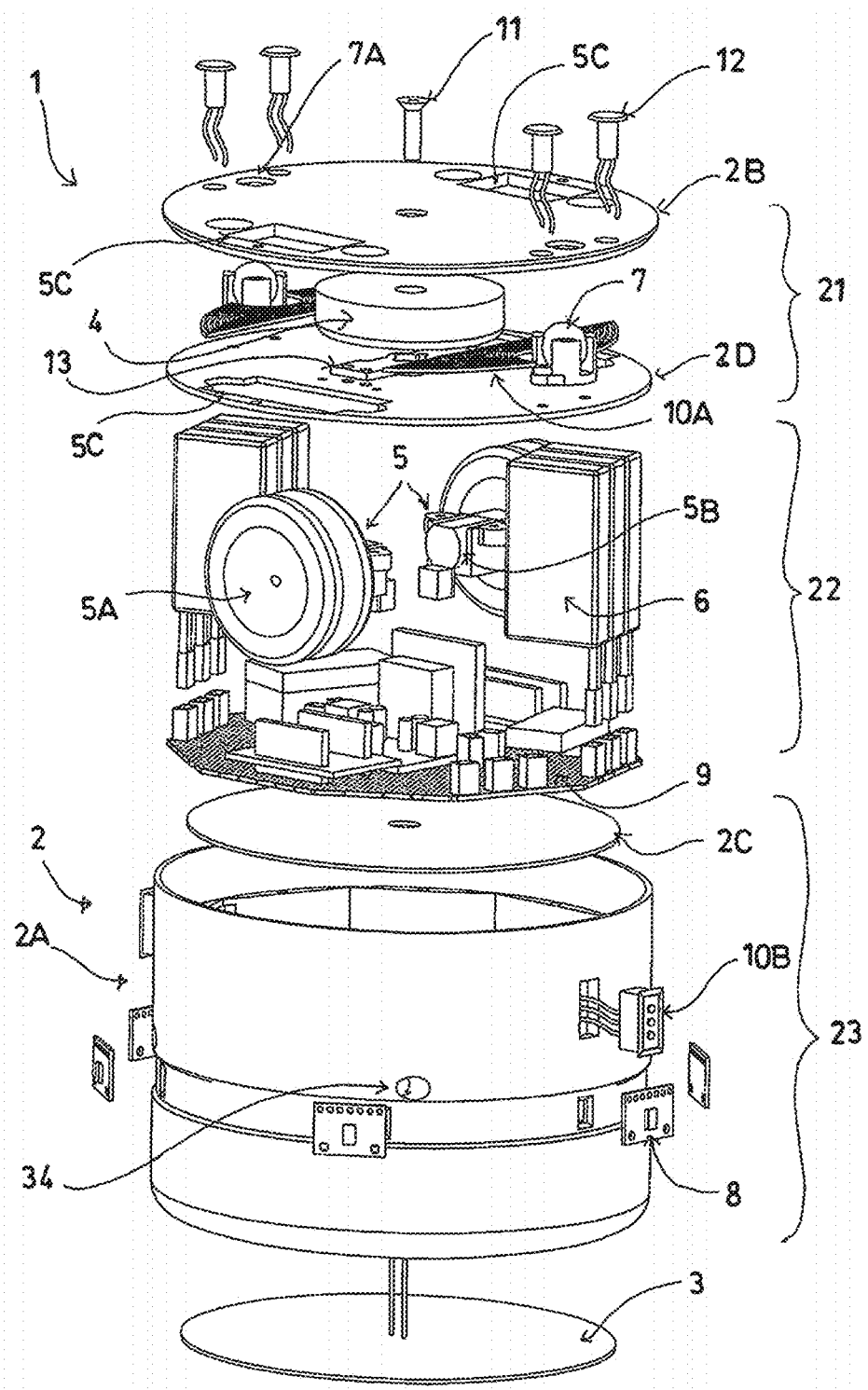
FIG. 1 shows an exploded view drawing of an illumination device, part of an illumination system under this invention.
Figure 2B:
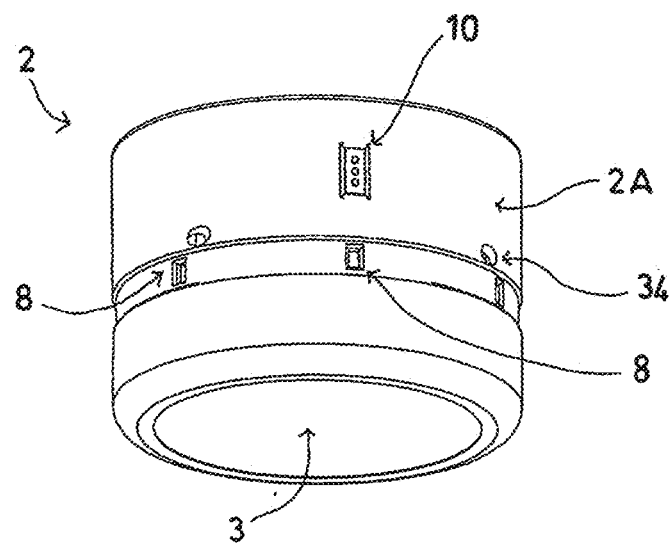
FIGS. 2A and 2B show prospective views from two different angles, of the illumination device shown in FIG. 1 when it is assembled.
Figure 2A:
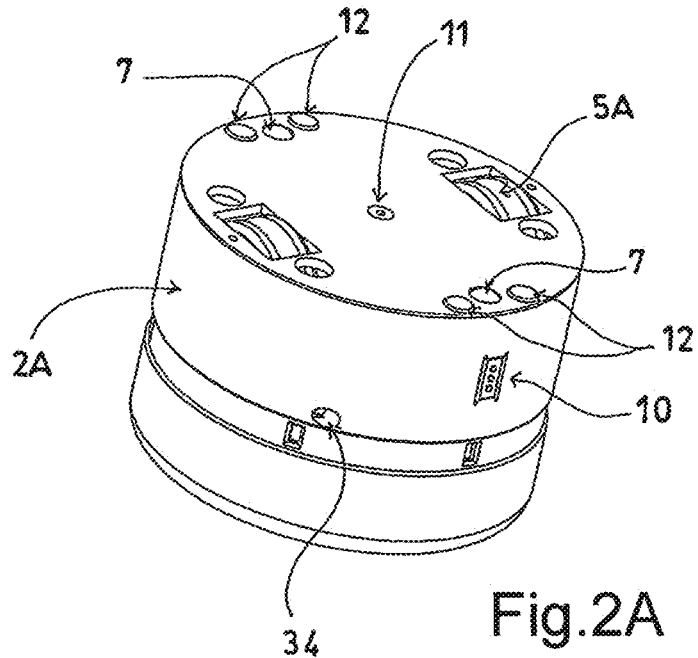

In particular, as shown in FIGS. 1, 2A and 2B, said illumination device 1 includes at least one light source 3 suitable for illuminating, preferably comprising light emitting diodes such as LED or OLED, installable in a casing 2; such casing 2 is made up of a hollow body, having desired shapes and dimensions, defined by one or more side-walls 2A.

In detail the casing 2, shown in the attached figures, can be essentially cylindrical and therefore is formed by a single side-wall 2A, nevertheless said casing 2 might have, for example, a parallelepiped shape with polygonal plant, comprising therefore a plurality of side-walls 2A.

Advantageously, one extremity of said casing 2 is closed in a first extreme end through a cover 2B, for example formed as or comprising a rigid panel. Furthermore, said casing 2 includes a first support and partition panel 2C and a second support and partition panel 2D, suitable for dividing said casing 2 in at least three compartments.

In detail preferably at least a first compartment 21 and a second compartment 22 are obtained, respectively determined by said cover 2B and said second support and partition panel 2D, and between said second support and partition panel 2D and said first support and partition panel 2D, suitable for containing functional components of the illumination device 1, therefore configured in such a way that they are preferably inaccessible or in any case barely accessible by the user. Furthermore, a third compartment 23 suitable for containing said at least one light source 3 can be provided.

Said first and second partition panels 2C and 2D are preferably and conveniently drilled in order to allow the transition of connection and power supply cables between said first compartment 21 and said second compartments 22.

In particular, as in the example shown in the attached figures, said light source 3 consists in an OLED, therefore comprising or made of a thin lighting layer suitable for generating a light beam for illuminating spaces. Said light source 3 can be removed and changed by way of the second extremity of said casing 2, opposed to the extremity where the cover 2B is installed.

Alternatively, when said light source 3 comprises or is made up of for example by LED or other devices, the second extremity of the casing 2 may be movably closed by a second covering element, conveniently realized with transparent materials, such as glass, in order to protect the light source 3 and to allow the homogeneous diffusion of the light.

Preferably, said light source 3 is furthermore installed in said third compartment 23, in such a way that it is swivelling and therefore able to change the direction of the light beam generated.

Potentially, said casing 2 may be realized in such a way that said third compartment 23 can be turned with respect to said first compartment 21 and said second compartment 22, for example by way of the predisposition of a convenient rotation linchpin.

Advantageously, said illumination device 1 may be provided with known means suitable for regulating and adjusting light beam, like for example lenses and optics manually or automatically movable and preferably housed within said third compartment 23.

Preferably the only light source or the whole of the light sources 3 of one and the same illumination device 1 emit an overall luminous flux equal to or greater than 30 lumen.

More preferably the overall luminous flux emitted by the the only light source or the whole of the light sources 3 of one and the same illumination device 1 is equal to or greater than 40 lumen.

More preferably the overall luminous flux emitted by the the only light source or the whole of the light sources 3 of one and the same illumination device 1 is equal to or greater than 60 lumen.

More preferably the overall luminous flux emitted by the the only light source or the whole of the light sources 3 of one and the same illumination device 1 is equal to or greater than 100 lumen.

More preferably the overall luminous flux emitted by the the only light source or the whole of the light sources 3 of one and the same illumination device 1 is equal to or greater than 200 lumen.

Such overall luminous flux can be also equal to or greater than 400 lumen, or than 800 lumen, or than 1500 lumen or 2300 lumen or 3000 lumen.

The lumen (lm) are considered according to the International System of units (IS), and for example are not ANSI lumen.

Advantageously driving means 5 are arranged in said second compartment 22; the driving means 5 preferably comprise at least one couple of powered rolling elements 5A, such as for example wheels or spheres conveniently connected to a corresponding electric motor 5B.

Preferably, said powered rolling elements 5A are arranged such that their rotation centres lie along a same axis or along axes lying parallel to each other, preferably adjacent arranged to said at least one side-wall 2A of said casing 2.

In fact, this configuration allows moving said illumination device 1 along a rectilinear direction, furthermore allowing it to rotate.

Advantageously, said second support and partition panel 2D and said cover 2B are provided with favourable bypassing openings 5C suitable for allowing at least a portion of said powered rolling elements 5A to protrude outside, allowing such rolling elements 5A to rotate freely.

Potentially, a plurality of spherical bearings 7 conveniently arranged in at least one hollowed or drilled housing 7A, obtained on a superficial portion of said casing 2 and suitable for being placed, in use, next to said support surface, for example comprising said cover 2B, can facilitate the movement of said illumination device 1, smoothing its movement on said support surface and avoiding contact and jamming between casing 2 and the support surface, eliminating their wear caused by the friction of these two surfaces.

Furthermore, preferably said illumination device 1 is provided with at least a couple of sensors 8, suitable for detecting instantly—or for example in real time—the position of said illumination device 1, preferably arranged essentially equidistant from each other and positioned on the perimeter of the surface of said side-wall 2A.

Moreover said proximity sensors 8 can be suitable for instantly detecting objects of any kind nearby said illumination device 1.

Advantageously, said illumination device 1 furthermore comprises convenient and known means suitable for receiving, elaborating and transmitting data, like in particular at least an electronic board 9, suitable for receiving and elaborating the data produced by said sensors 8.

Furthermore, said electronic board 9 can control switching on and off, dimmerization and potentially the inclination of said light source 3, as well as commanding said driving means 5 in order to move said at least one illumination device 1 within a support surface.

Up to this point, an illumination device 1 may be positioned on a support surface essentially horizontal, suitable for bearing the weight of said illumination device 1, and comprises means suitable for its movement on said support surface, which therefore can corresponds essentially to a floor, a piece of furniture surface or another furniture element.

Nevertheless, according to a convenient feature of the present invention, said support surface can be defined by a support structure 30, 40, 50 allowing the positioning or the movement of an illumination device 1 also, for example, on the side walls or on the ceiling of a residential location.

Figure 3:
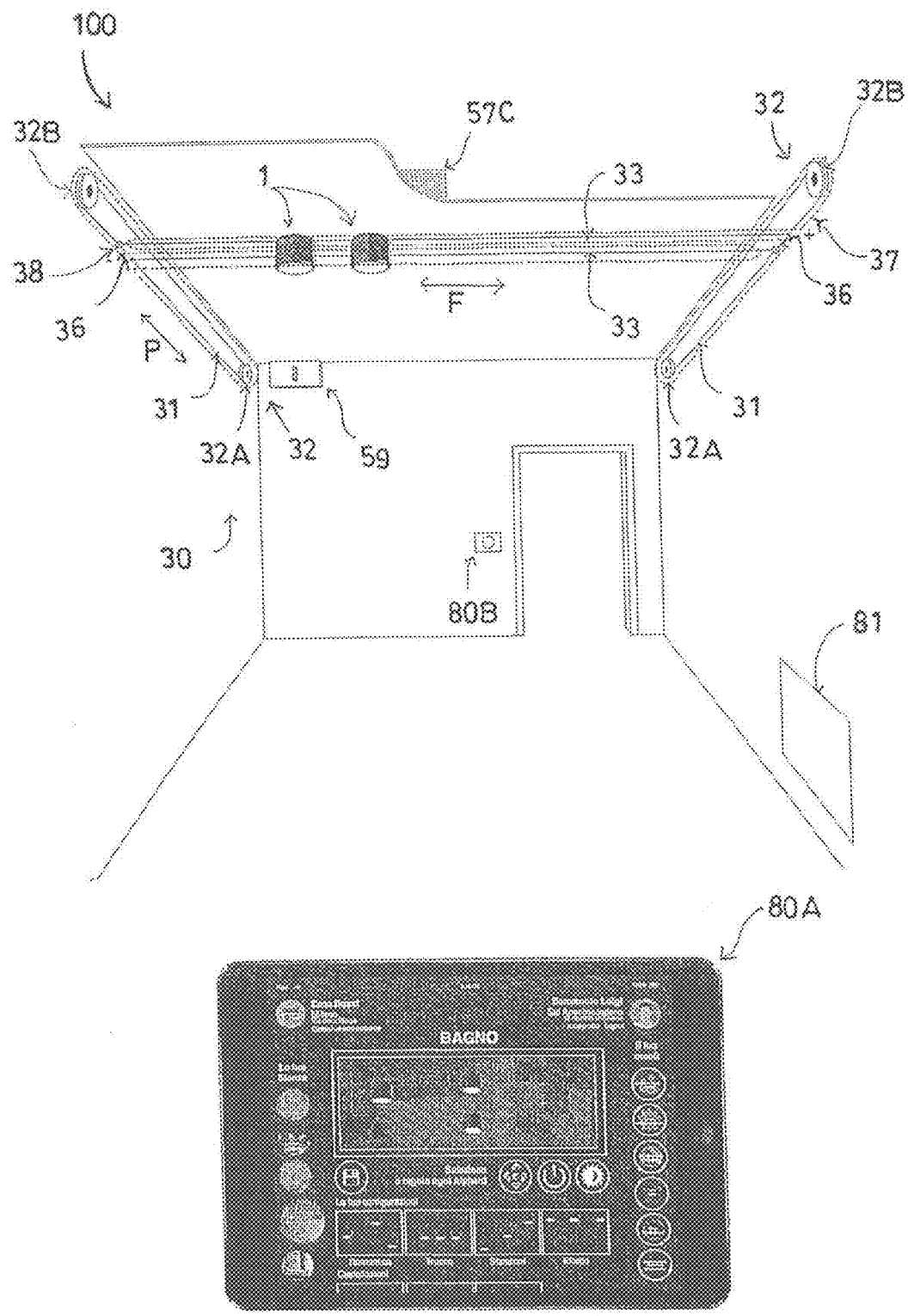
FIG. 3 shows a prospective schematic view of a particular embodiment of an illumination system according to this invention.

In FIG. 3 an illumination system 100 is shown, comprising a support structure 30 according to a first embodiment of the present invention, suitable for holding said at least one illumination device 1 suspended upon the floor, so that it can be advantageously moved on a support surface different than the floor.

For example, said structure 30 can be mounted on the walls in a home space at a desired height, preferably on the top part of it for example in close proximity to the ceiling, in order to move said illumination device 1 on a support surface essentially horizontal.

Alternatively, said support structure 30 may be mounted on the side wall of a room that needs to be illuminated, in such case the illumination device 1 can be moved along a vertical support surface.

In particular, preferably, said support structure 30 is equipped with support means 33 comprising at least one couple of parallel cables suitable for passing through said casing 2 by means of specific couples of bypassing holes 34 created on said side-wall 2A and engaging the external perimeter surface of said wheels 5A which in this case is preferably grooved. Said parallel cables of said support means 33 introduce themselves between said grooves of said rolling elements 5A and specific grooves created on the surface of said dividing panel 2C, oriented towards said second compartment 22, in such way that said illumination device 1 can move along the whole extension of said support cables 33, which defines its support surface.

Conveniently, the respective ends of said support cables 33 are connected to driving means provided with a couple of guiding cables 31 (preferably metallic) and arranged in parallel on two opposite and facing walls of the location that needs to be illuminated.

Advantageously, each one of said guiding cables 31, is closed-loop and engages a corresponding couple of return pulleys 32; preferably for each couple of return pulleys 32 there will be a powered return pulley 32A, suitable for transferring the running movement to the guiding cable 31 engaging said return pulley 32A, while an idle pulley 32B is mounted on the wall 1 for accompanying and returning said guiding cable 31.

Preferably the system is conveniently configured in such a way that guiding cables 31 are moved by their respective powered driving pulleys 32A simultaneously.

The evident result is that thanks to the rotation of said powered rolling elements 5A, said illumination device 1 can move essentially at least along one first direction, indicated with the arrow F represented in FIG. 3 and determined by the extension of said support cables 33.

Moreover, thanks to the couple of powered driving pulleys 32A, the illumination device 1 can also move along a second direction, indicated with the arrow P in FIG. 33, preferably orthogonal to said first direction, and determined by the extension of said guiding cables 31.

In this way, an illumination system 100 provided with a support structure 30 above described, allows one or more illumination devices 1 be moved to any point of a support surface coinciding with the lying plan of said device 1.

Said system 100 turns out to be particularly advantageous as it can be installed and used in those situations where the location, which needs to be illuminated, is characterized by architectural peculiarities that would not permit illumination device 1 to run on the walls.

For example, the ceiling might be characterized by wooden beams, by irregular outer finishes or in any case by decorations that can't be covered or altered.

Advantageously, on said guiding cables 31 more than one couple of support cables 33 can be associated and every couple of support cables 33 can include more than one illumination device 1; in this case, the use of said sensors 8 is particularly advantageous as it avoids possible collisions between illumination devices 1 of said illumination system 100.

Naturally, said illumination devices 1 can be mounted on said support structure 30 in such a way that the light beam, projected by said light source 3, is oriented downwards; nevertheless they may be mounted on said support cables 33 upside down, in such a way that said light source 3 illuminates upward, for example in this way it could illuminate and therefore enhance certain details or decorations of the ceiling or even illuminate the location through reflected light, for example in those cases where the ceiling surface is reflective for example covered by mirrors.

Lastly, said illumination device 1 can include a pair of light source 3, arranged in such a way that they can illuminate two opposite surfaces of the location that needs to be illuminated.

Alternatively, said illumination system 100 can comprise a support structure 40 according to a second embodiment of this invention, shown in FIGS. 4A and 4B. Said support structure 40 comprises accompanying means 44, for example a pair of wheels, suitable for pouring along a corresponding couple of guide tracks 45, that could be for example fixed to the side walls or to the ceiling of the location that needs to be illuminated. Said accompanying means 44 are conveniently and operatively connected to said powered rolling means 5A of said illumination device 1 by means of support and transmission.

In particular, preferably said support and transmission means are provided with a couple of support and transmission cables 41, each one suitable for being closed-loop and engaged between a respective wheel of said couple of powered rolling elements 5A of said illumination device 1, advantageously engaging the corresponding perimeter groove, and a respective pulley of a couple of driving pulleys 42 solidly mounted on a transmission shaft 43, like a rigid shaft, which is connected by the opposite extremities to said accompanying wheels 44 running on said guide tracks 45.

Illumination device 1 can therefore move taking advantage of the coordinated movement imposed by the electric motor 5B and transmitted to each running wheel 5A, which engage said support cables 41 transferring to them the movement, which is therefore transmitted to the transmission shaft 43, simultaneously rotatable with them. The rotation of the transmission shaft 43 is then transmitted to the accompanying wheels 44 that move the illumination device 1 along a direction, shown in FIG. 4B with arrow M, on a support surface which is, in this case, defined by the extension of guide tracks 45.

Conveniently, both support structure 30, according to the first embodiment of the present invention, and the support structure 40, according to the second embodiment of this invention, can be also installed in open spaces such as city squares, gardens, yachts etc. This can be done also through the installation of pillars suitable for fixing all the elements.

Up to this point we have not mentioned how the illumination device 1 gets electric energy in order to supply the needed power to all of its components. In regards to the embodiments where the above described support structures 30 and 40 are used, power supply is transmitted to the illumination device 1 thanks to conductive materials used for some of the components of said support structures. In particular, preferably, said couple of powered rolling elements 5A is suitable for transferring electric power supply to at least said electronic board 9 through the support means of the respective support structure 30, 40; said support means are conveniently made of a conductive material.

With reference to support structure 30: electrical supply is imparted, preferably in direct current or with extra low voltage (below 50V) to guiding cables 31. One of the two rings of said guiding cables 31 represents the positive pole 37 of said power supply, while the second ring of said guiding cables 31 represents the negative pole 38 of said power supply. From the above mentioned guiding cables 31, power supply goes on through support cables 33, reaching the powered rolling elements 5A from where it is transmitted through, for example, brushes or other kinds of contact, in order to be transmitted to all the components of said illumination device 1 that need to be powered.

In order to avoid short-circuits between the two sides 37 and 38, insulated connecting elements 36 can be placed among guiding cables 31 and support cables 33.

With reference to the support structure 40, power supply is imparted to illumination device 1 with the same principle: power supply is in fact transmitted through guide tracks 45, accompanying means 44, transmission shaft 43, transmission pulleys 42 and support cables 41, reaching the powered rolling means 5A.

Moreover the insulated element 46, that prevents the short-circuit between the two sides, is placed in the middle of said transmission shaft 43.

Advantageously and preferably, the illumination device 1 is equipped with electric accumulators, for example a battery 6. This allows the illumination device 1 to be powered also when it is not used together with the above-described support structures 30 and 40.

Figure 6:
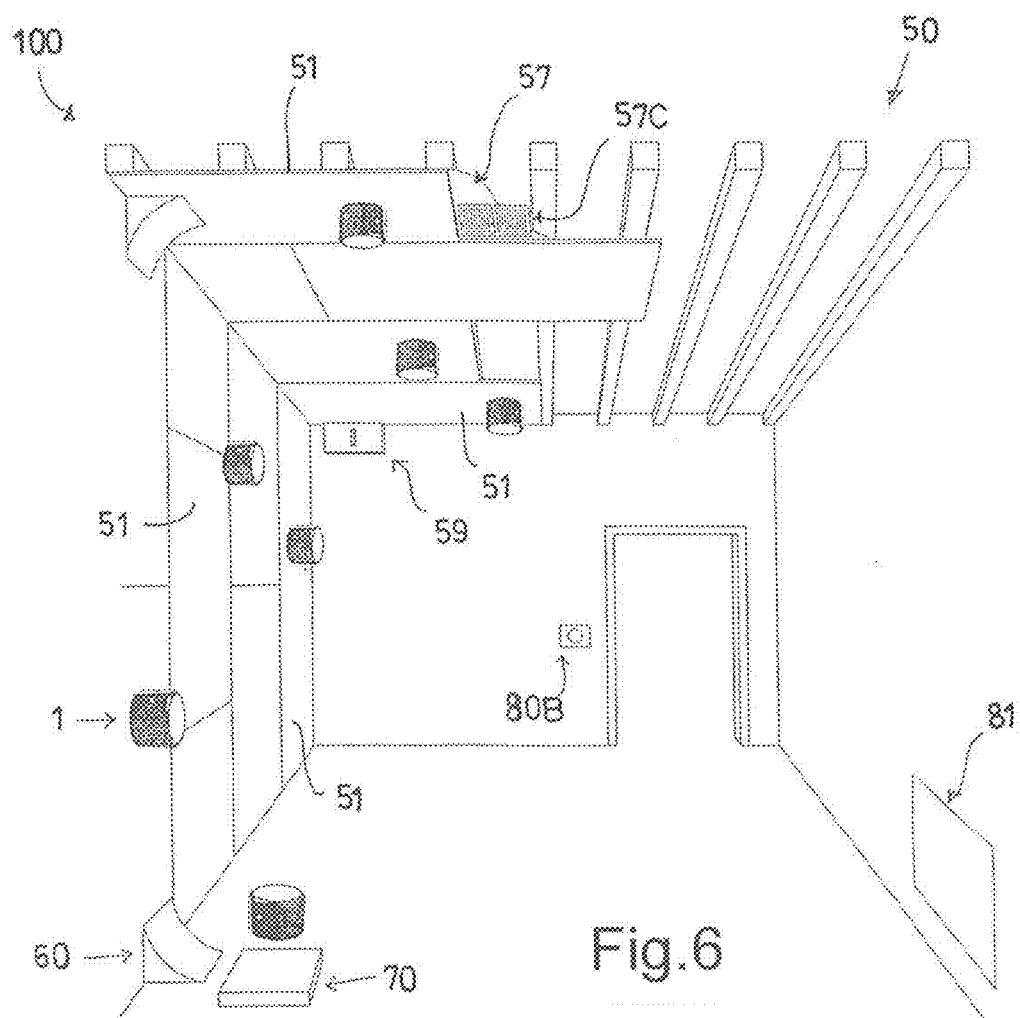
FIG. 6 shows a schematic prospective view of a particular embodiment of an illumination system according to this invention.

With reference to the FIG. 6, is shown an illumination device comprising a support structure 50 according to a third embodiment of the present invention.

In detail, said support structure 50 comprises at least one ferromagnetic support panel 51 and preferably a plurality of ferromagnetic support panels 51, arranged adjacent to each other, each one comprising at least one ferromagnetic element.

Said structure 50 can be set on any surface of the room that needs to be illuminated, like for example the ceiling, the side walls and the floor, and it is suitable for forming the support surface for said at least one illumination device 1.

In this case, said at least one illumination device 1 is furthermore equipped with at least one magnet 4, preferably arranged essentially centrally in the casing 2 and advantageously arranged within said first compartment 21, facing said cover 2B.

Alternatively, the illumination device 1 can be equipped with a plurality of magnets, arranged preferably symmetrical and balanced in order to guarantee uniform attraction of said illumination device 1 on said support surface.

Advantageously, said illumination device 1 can be provided with fixing and adjusting means 11 next to said cover 2B, for example comprising a screw that can be screwed in a hole that crosses said magnet 4, in order to allow a fast adjustment of the distance between said magnet 4 and said cover 2B, therefore between said magnet 4 and the support surface comprising said ferromagnetic panel 51, adjusting in this way the force of attraction.

Said fixing and adjusting means 11 acts preferably directly on the position of the magnet 4 within the illumination device 1. Such adjustment might be also automated.

Said fixing and adjusting means 11 might also act on an eventual containing element of said magnet 4, instead of acting directly on the magnet.

Said ferromagnetic panels 51 form preferably the structural and decorative base of the interior and they can be supplied in different dimensions, being also possibly cut and shaped during the assembling phase in order to obtain the desired measures; said ferromagnetic panels 51 are advantageously projected in order to be installed on rough or finished ceilings, walls and floors.

The structure of the panel 51 is preferably of the "sandwich" kind and comprises at least one element essentially flat and realized with ferromagnetic material 54; for example, said ferromagnetic element 54 can comprise a foil that can be drilled or pierced in order to reduce as much as possible the weight of the panel 51.

In this case, advantageously, the diameter of the holes and the spacing between them are conveniently sized in order to reach the biggest possible dimension, or rather lightness of the panel, keeping the magnetic force of attraction uniform.

Alternatively, said ferromagnetic element 54 can be formed, for example, by a flat mesh of ferromagnetic material.

Said ferromagnetic element 54 can therefore comprise a mesh or by a foil, that can be solid or forming holes and have various thicknesses, being potentially zinc-coated and/or painted.

Said characteristics might change in relation to different needs like for example: panel lightness, magnetic attraction and protection of the ferromagnetic element from oxidation.

Figure 5A:
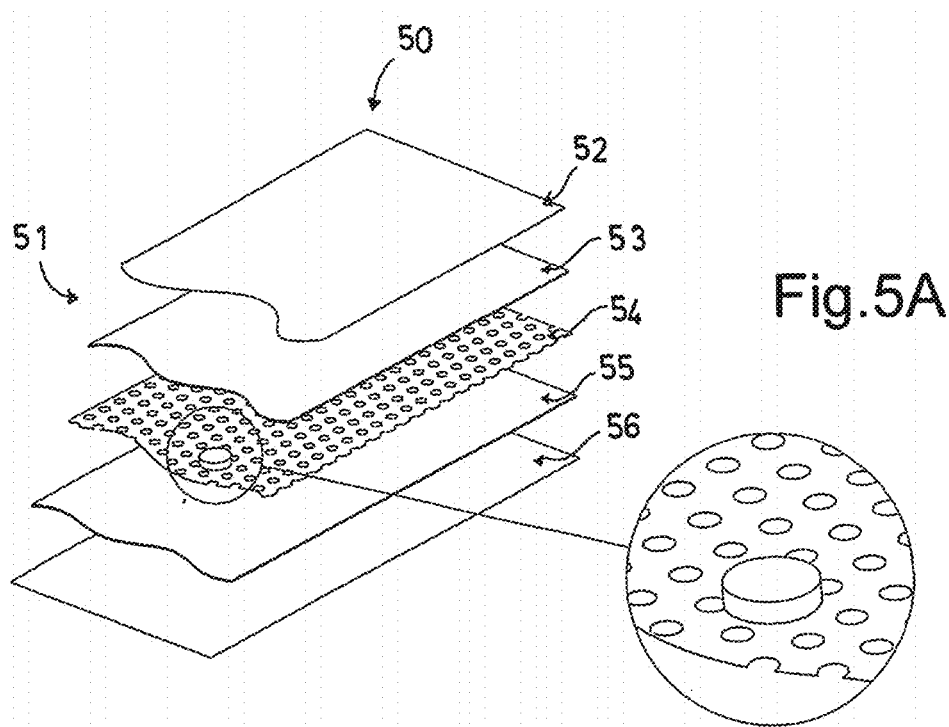
FIGS. 5A and 5B show an exploded view drawing of two alternative components of an illumination system of a particular embodiment under this invention.
Figure 5B:
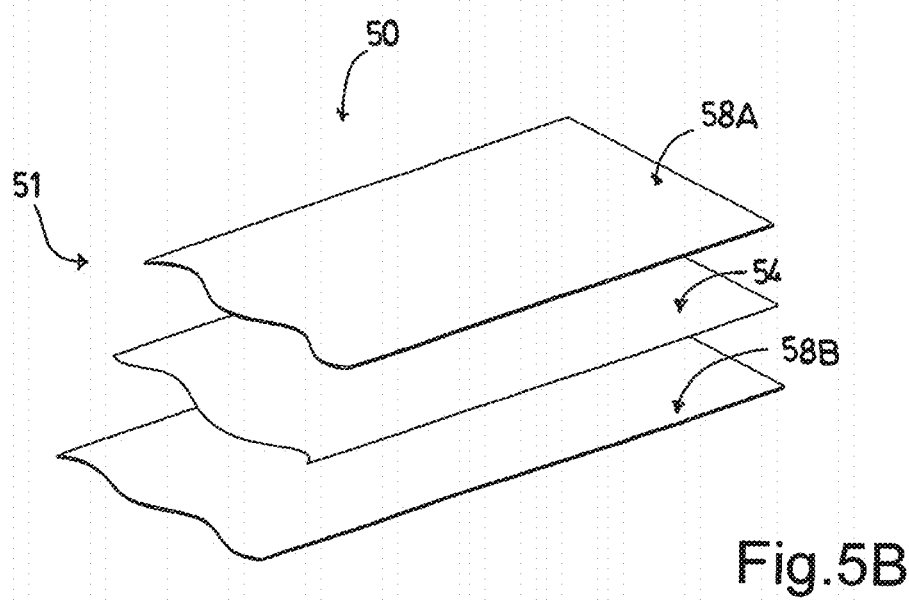

As for the characteristics of ferromagnetic element 54, also the structure of panel 51 may vary, FIGS. 5A and 5B show two possible embodiments of its structure.

In one embodiment, shown in FIG. 5A, said ferromagnetic support panel 51 comprises preferably one cardboard layer 52, one structural plaster layer 53, said flat ferromagnetic element 54, a second plaster layer 55 and a second cardboard layer 56.

The process of construction of the ferromagnetic panel 51 is easily manufactured industrially in comparison to the state of art of the plasterboard's manufacturing standard: in fact, it is sufficient to add one manufacturing step just before the baking of the plasterboard, that consists in immerging the flat ferromagnetic element 54 inside the plaster's liquid blend.

In a second embodiment, said panel 51, shown in FIG. 5B and having a "sandwich" structure, comprises a first plasterboard panel 58B, a ferromagnetic element 54 and optionally a second plasterboard panel 58A and optionally a second plasterboard panel 58A.

The thicknesses of said plasterboard layers 58A and 58B may vary in relation to the typology of structure 50.

Both the plasterboard layers 58A and 58B may have a structural function, the plasterboard layer 58B also has finishing function.

Furthermore the thickness of plasterboard panel 58B affects characteristics of the above-mentioned ferromagnetic element 54, nevertheless the dimension of the magnet 4 of illumination device 1.

Advantageously, in said second embodiment of the panel 51, elements 58A and 58B can be realized with other materials than the plasterboard.

For example, they can be made of wood, chipboard, plastic or metallic (non-ferromagnetic) materials.

Furthermore said panel 51 can be finished with decorations and inserts such as leather, textiles or other materials, rendering it a ready-to-use panel.

The result of the process is therefore a panel that, differently from the current plasterboard panel, acquires ferromagnetic properties and more structural robustness.

Alternatively, said panel 51 can be made inserting a plurality of ferromagnetic elements like for example fibres, chips, rods, powders or spheres, in a plaster blend.

Despite its different structure compared to the current standard of plasterboard panels, the ferromagnetic support panel 51 can be mounted easily, as per the state of art known by all the constructors and construction industry professionals.

The panel is projected to be installed on two different structural and surface typologies.

The panel can in fact replace the current plasterboard panel, being mounted and fixed with screws on steel pillars conveniently fixed on walls and ceilings.

The thickness of ferromagnetic element 54 is conveniently sized in order to be drilled with screws.

The support structure 50 is then finished with stucco work, smoothing and painting of the surface.

Alternatively said panel 51 can be fixed to existing structural walls and ceilings through various and known fixing methods.

Said structure 50 confers another important architectural benefit as it reduces the needed height of the ceiling gap.

In the current state of art plasterboards ceiling structures comprise a gap suitable for allowing inspections and distributing the electrical and lighting systems components.

The illumination system 100 equipped with a structure 50 allows eliminating the mentioned gap, as it does not comprise any cable or tube in the ceiling.

This means consistent heights reductions.

For example, in the case of buildings with a plurality of floors, this can entail space-savings that can be used for more height within the apartments or more residential spaces.

Said support structure 50 therefore defines, as said, the support surface wherein the illumination devices 1 can move or can be positioned, taking advantage of magnetic attraction.

Said ferromagnetic panels 51 can be therefore all over the location surfaces or just on certain areas: for example, structure 50 may be installed on the ceiling of all the rooms or just on some of them, like the living rooms, more subjected to purpose, use and activity variations.

As an example, the panelling can be installed all over the ceilings of an office building or only over the zones effectively dedicated to office-work. Structure 50 is projected to be mounted on horizontal, vertical and oblique surfaces, being therefore installable for example on locations like mansards that could be characterized by the inclination of the ceiling due to the structural roof inclination.

Preferably, said illumination device 1 can be equipped with magnetic sensors 12, suitable for detecting the presence of ferromagnetic material on the support surface of illumination device 1, and a magnet attraction force sensor 13 suitable for verifying that the force of attraction of magnet 4 is adequate in respect to the ferromagnetic surface.

This signal, that is received, managed and transmitted by said electronic board 9, can be advantageously translated in a luminous signal generated by light source 3, by another warning light (not shown in the figures) or in another acoustic or other signal for example a vibration that might authorize the user to release the illumination device 1 during the installation.

Once the illumination device 1 is released on the support surface, the magnet attraction force sensor 13 can remain constantly active and said electronic board 9, connected to the magnet attraction force sensor 13, can block the movement of said illumination device 1 if it finds out that the magnetic force of attraction is lower than the set minimum value.

In general, an illumination device 1, as previously described, would not be able to move from a horizontal support surface to a vertical support surface, due to the presence of corners.

This problem has been solved according to a system, in accordance with the present invention, where a connecting member 60 like a "slide", chute or ramp is arranged in such a way that it links a side wall and a ceiling or a side wall and a floor, or even connecting a side wall to another side wall, as shown in FIG. 6.

Slide 60 can comprise a shaped surface, that can be curved or inclined and advantageously realized with ferromagnetic material, allowing illumination device 1 to move from a surface to another, also between running surfaces mutually inclined.

The dimensions of slide 60 and the range of its shaped surface are conveniently sized in relation to the dimensions and the shape of illumination device 1.

Illumination device 1 can therefore move without any limitation from a horizontal surface, like for example the ceiling, to a vertical surface, for example a side wall, moving to another horizontal surface, like the floor.

In other words illumination device 1 can freely move on all the surfaces of the location.

Also for the above-mentioned embodiment of the present invention, comprising a support structure 50, it is preferable that said illumination device 1 comprises at least one battery 6 suitable for supplying power to all the components of said illumination device 1.

Advantageously, illumination device 1 is equipped with power receptors 10. Said power receptors 10 can be contact-type 10B or wireless-type 10A.

Said power receptors are able to transmit the power received to the battery 6 or directly to the electronic board 9 or to other internal power consuming devices, therefore to all the components that need power inside the illumination device 1.

In accordance with a beneficial characteristic of the present invention, said illumination system 100 can comprise one or more powering stations, preferably connected to the electricity grid of the location where said at least one illumination device 1 is used, suitable for powering one or more illumination device 1, in particular the battery 6 or directly the electronic board 9.

Said powering station can be contact-type 59 or wireless-type 57.

Figure 7A:
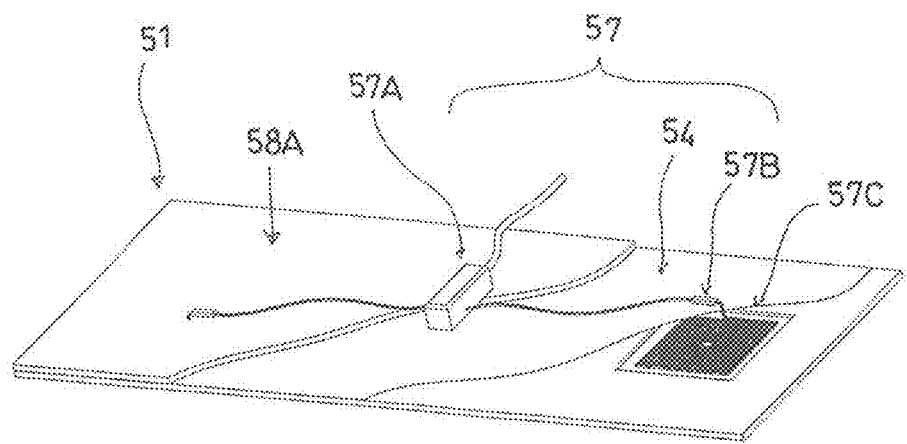
FIGS. 7A and 7B show two components suitable for supplying power to one or more illumination devices included in an illumination system in accordance with this invention.
Figure 7B:
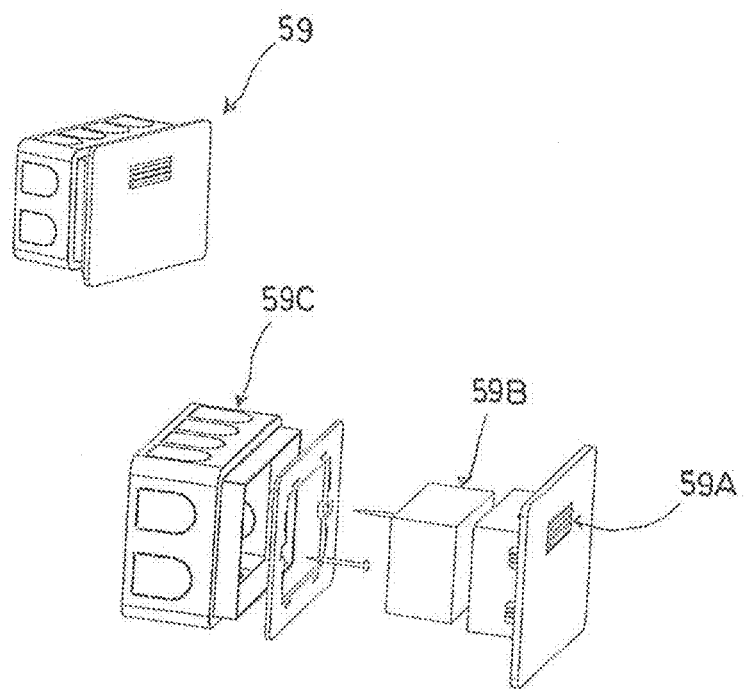

Contact-type powering station 59, for example shown in FIG. 7B, can comprise a plurality of powering contacts 59A, a power supply 59B and a containment casing 59C.

The power supply 59B is suitable for supplying power to said contacts 59A; the powering contacts 59A are suitable for allowing the contact with an illumination device 1, which is provided with one or more power receptors 10B, for example arranged on the surface of casing 2 and preferably next to the external surface of said side-wall 2A.

Containment casing 59C is suitable for containing the above-mentioned components and it can be built in the wall or mounted externally.

For example, as shown in FIG. 1, said power receptors 10B are arranged diametrically opposed to each other.

Finally, said power receptors 10B allow said illumination device 1 to connect both to the powering station as well as to other illumination devices 1 of said illumination system 100, allowing the simultaneous and multiple charge of illumination devices 1.

Wireless powering station 57, shown in FIG. 7A, is preferably provided with a power supply 57A, connected to the electricity grid and suitable for supplying power to an electronic board 57B, operatively connected to an inductor 57C and suitable for transforming the energy supplied by the power supply 57A in such a way that said inductor 57C can transfer it to a wireless power receptor 10A, provided in an illumination device 1 and advantageously arranged in such a way that it is next to the support surface.

Advantageously, said inductor 57C can preferably be arranged inside the panel 51.

For example, in case that said panel 51 is realized in accordance with the second embodiment, shown in FIG. 5B, the containment hole of said inductor 57C can be advantageously obtained in the second plasterboard 58B; this solution allows to reduce the distance between the inductor 57C and the power receptor 10A, improving the performance.

It is known that said wireless power supplying system can experience malfunctions when ferromagnetic elements are positioned in proximity of the inductor.

Such problem has therefore been solved with three important expedients: the inductor 57C has been arranged under the ferromagnetic element 54 of said panel 51, therefore it is not interposed between said inductor 57C and the power receptor 10A; a ferrite layer has been arranged between the ferromagnetic element 54 and the inductor 57C, suitable for concentrating the flow toward the illumination device 1; the electronic board 57B has been configured in such a way that it can transmit a frequency to the inductor 57C that does not cause a resonance with the material of the ferromagnetic element 54.

The ferrite layer is advantageously arranged also for shielding electromagnetic disturbances and/or improving the magnetic adhesion of the illumination device 1 to a support structure 30, 40, 50 and/or to the walls or ceiling of a room or other part of a building.

Advantageously, in another embodiment, the inductor 57C of the wireless powering station 57 will be arranged inside a panel made of—or however containing—plasterboard, wood or other materials, provided with one or more magnetic elements suitable for guaranteeing attraction to said at least one illumination device 1, equipped with said at least one magnet 4 or, where appropriate, with a ferromagnetic element preferably installed on or in the casing 2, or anyway installed on or in the first compartment 21.

The return to the powering station 57, 59 can be advantageously executed by the illumination device 1 automatically, for example the electronic board 9 can activate powered rolling elements 5A after having received the signal from the battery 6 indicating that the set minimum charge limit has been passed.

The powering stations 57, 59 can be suitable for loading not only the illumination devices 1 but other electronic devices and household appliances such as mobile phones, tablet computers or other computers, televisions.

To this purpose each powering station is preferably arranged for supplying the other devices to be loaded with an electric power of at least 5 Watts, at least 10 Watts, at least 15 Watts or at least 30 Watt.

Illumination devices 1 can also be equipped with one, two or more power receptors 10, being therefore able to charge themselves simultaneously, positioning themselves alongside each other, or rather mutually adjacent, with the first in line positioned next to the powering station.

This allows, in some cases, the presence of just one powering station within the whole location; being the powering station able to impart electricity to a plurality of illumination devices 1 simultaneously.

Therefore there is no need of as many powering stations as the number of illumination devices and the user can arrange the powering station where he thinks it is more appropriate, nice and agreeable.

A breaking system may be provided within the illumination device 1, such breaking system can be operatively connected to said motors 5B or even to said powered rolling elements 5A; it is suitable for blocking immediately the illumination device 1 when it moves along a vertical support surface.

Finally, an illumination device 1 equipped with a magnet 4 can move or be moved on a support surface comprising panels devoid of ferromagnetic material, thanks to the positioning of a second magnet on the opposite surface; this second magnet is suitable for moving together with illumination device 1 keeping it firmly anchored to said support surface.

This solution is particularly advantageous when the illumination device 1 needs to be moved along a glazed surface.

In this case, advantageously, the illumination device 1 can be equipped with a photovoltaic panel conveniently sized, suitable for supplying power directly to the electronic board 9 or for charging said battery 6.

Figure 9:
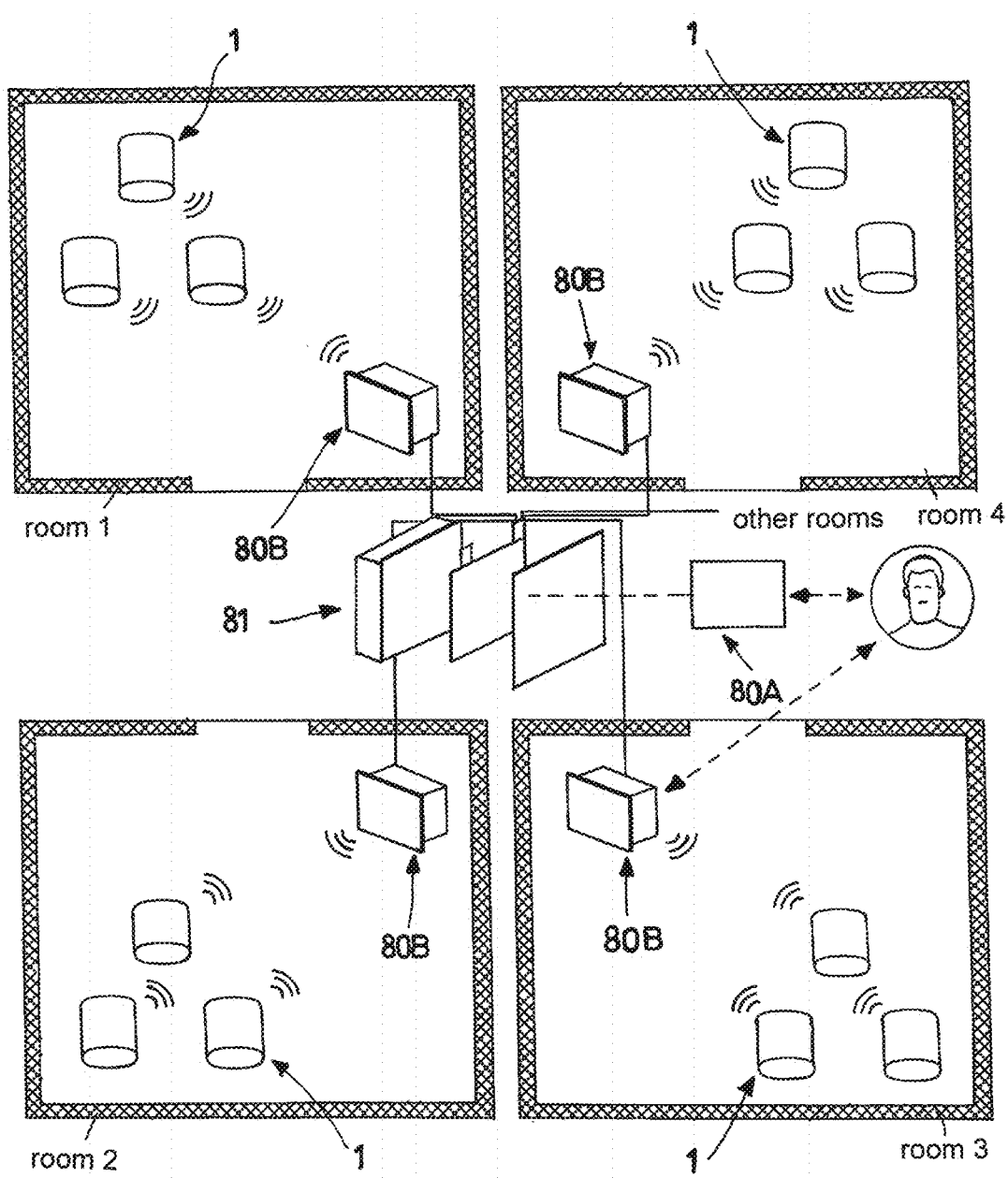
FIG. 9 shows a graphic diagram of the communication between some of the components that compose an illumination system in accordance with this invention.

With regard to the FIG. 9, is noted that the electronic board 9, inserted in said illumination device 1 of said illumination system 100, is suitable for receiving, processing and transmitting data, therefore communicating with other elements that compose the system, like a first command interface 80A, a second command interface 80B and a central control unit 81 suitable for controlling, commanding processing and transmitting data.

Said central control unit 81 may comprise a power supply, a computer suitable for processing and storing data, a router, a possible signal transducer and a casing.

Figure 8C:
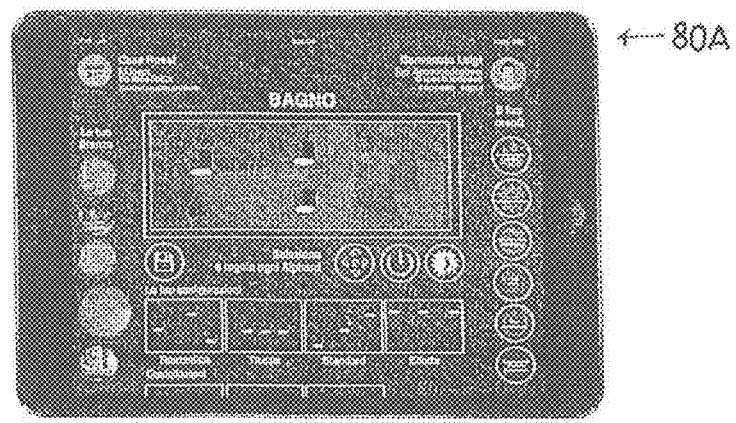
FIG. 8C shows a second embodiment of a command interface suitable for controlling and transmitting data within an illumination system under the present invention.
Figure 8A:
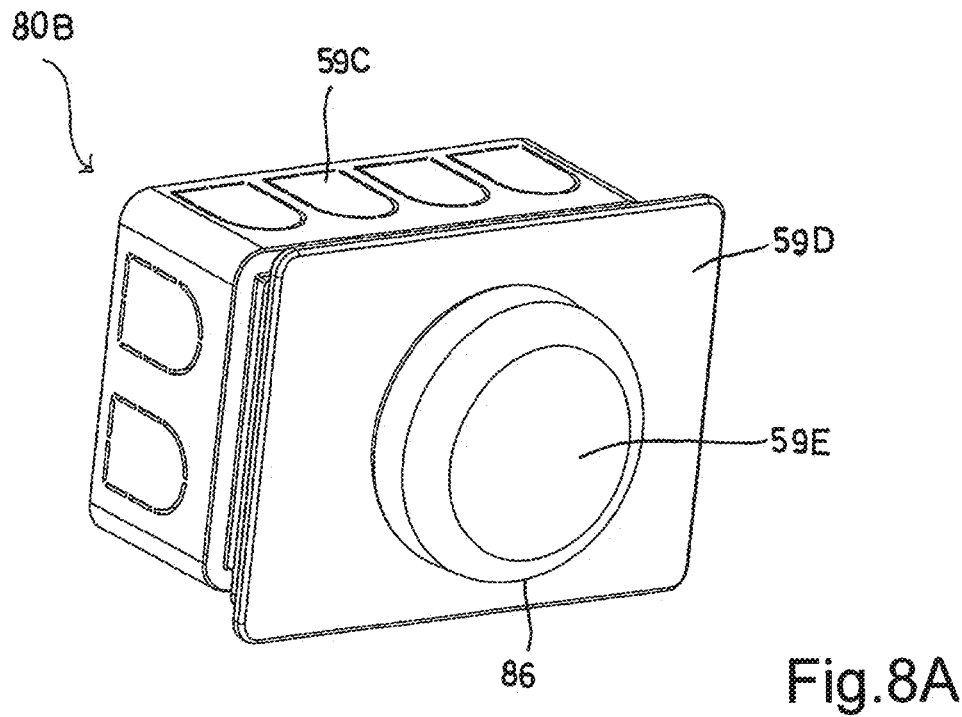
FIGS. 8A and 8B show a command interface, suitable for controlling and transmitting data within an illumination system according to this invention.
Figure 8B:
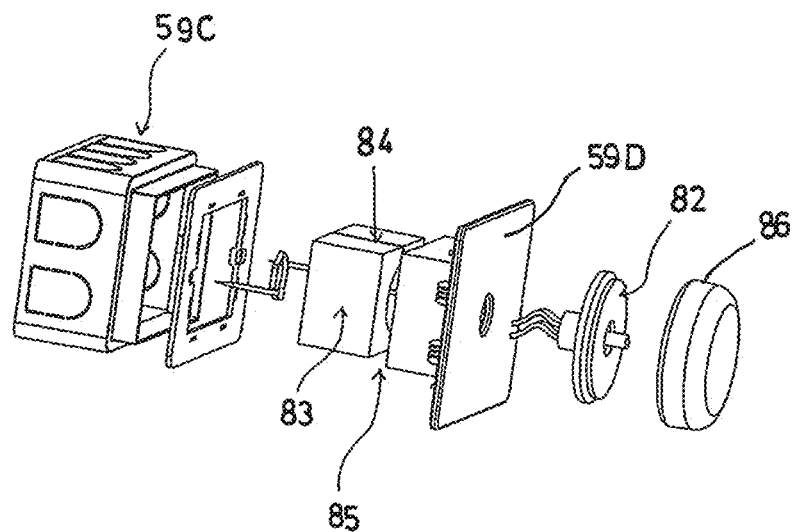

As shown in FIGS. 8A and 8B, said second command interface 80B can comprise a containment casing 59C and/or a front panel 59D.

The containment casing 59C can be for example substantially the same or similar to the containment casing 59C of the powering station 59 and for example be suitable for being concealed in a wall.

The containment casing 59C of the second command interface 80B can be made of plastic material and be formed for example like a flush mounting box.

The front panel 59D can be fixed to the casing 59B and be decorative or however have an agreeable appearance.

As shown in FIGS. 8A and 8B, said second command interface 80B can be provided with a power supply 83, a signal transducer 84, a repeater Wi-Fi, Bluetooth, Zigbee, Wibree, a wireless repeater in general and/or a wireless transceiver 82, a microcontroller 85 and transducers 86 like for example buttons, press-buttons and/or rotatable knobs, levers, mechanical fingers, triggers or other sensors suitable for receiving commands from a user. Said sensors can for example comprise microphones suitable for voice recognition or gesture recognition means.

Advantageously said second command interface 80B can be provided with one or more videocameras and possibly with a system for motion recognition in order to recognize user's command given as body movements, microphones suitable for allowing the second command interface 80B be controlled through voice commands.

Advantageously said second command interface 80B can be provided with image and/or voice recognition systems for example comprising a microcomputer or microprocessor housed in the containment casing 59C and running suitable computer programs.

Such devices 82, 83, 84, 85, 86, sensors, logic units or other electronic devices if any can be housed in the containment casing 59C and/or arranged behind front panel 59D so as to be concealed by it.

More particularly such transducer 86 can comprise for example a rotatable knob which can also operate as a press-button reversibly switch from a depressed position to a raised position.

To this purpose, such rotatable knob 86 can have for example one of the following overall shape: a substantially cylindrical, parallelepipedal or prysmatic shape, conical-, pyramidal or frustum conical shape, dome or hemispherical shape, surface of revolution shape.

The front panel 59D and/or the knob, press button or other transducer 86 can be backlit or provided with backlit zones in order to be seen in the dark or to send visual signals to the user.

To this purpose the front panel 59D and/or the knob, press button or other transducer 86 are advantageously provided with analog or digital screens such as LED- or OLED-displays.

Still to this purpose, the rotatable knob and/or push button 86 can be provided with a central backlit area 59E, arranged around the centre or its outer surface and/or around its rotation axis, if any.

The second command interface 80B can be provided with one or more ethernet connections, such as Ethernet sockets or plugs allowing to connect the second command interface 80B to a network of computers and/or other electronic devices not only wireless but through cables as well.

Advantageously such ethernet connections of the second command interface can be suitable for supplying not only data and informations but also electric power.

The previously described second command interface 80B can consequently act as a WiFi hotspot and be part of an Internet-Of-Things network.

Since it act inter alia as a light switch, it is quite suitable for widely dispersing WiFi—or other wireless signals easily and at low costs in a building, lowering at the same time the overall power level needed of the electromagnetic fields.

Said first command interface 80A can coincide with known electronic devices like for example PC, tablets, smartphones, displays, touch screens etc. as shown in FIG. 8C.

Preferably and advantageously every room of a location, where said illumination system 100 is installed, is equipped with at least one illumination device 1 and said second command interface 80B.

Moreover, at least one central control unit 81 is preferably installed within said location.

Advantageously, the central control unit 81 can be connected to one or more said second command interface 80B by means of known transmission data means like Wi-Fi, fiber optic cables, power-line or other kinds of cables like for example Ethernet.

Advantageously said second command interface 80B is equipped with at least one Wi-Fi repeater and/or a wireless transceiver that in addition to functioning as a control/command interface it is suitable for communicating with said electronic board 9, arranged inside said illumination devices 1, with said first command interfaces 80A and with other devices equipped with Wi-Fi or other wireless communication technology, like for example smartphone, PC, tablets etc.

Thanks to the installation of at least said second command interface 80B in every room of the location, equipped with said at least one Wi-Fi repeater 82, the Wi-Fi signal distribution within said location is particularly advantageous as balanced and uniformly distributed all over the location, moreover the Wi-Fi signal strength is particularly reduced.

Such solution advantageously allows avoiding those typical situations where the router needs to release a strong signal in order to reach every area in the location.

Preferably, said illumination system 100 comprises fiber optic cables for connecting said central control unit 81 to said second command interfaces 80B, in fact this kind of cable allows transmitting a great deal of data, being therefore able to process both the data relative to the functioning of said illumination system as well as the data of any device connected to the Wi-Fi network or other wireless or wired network (smartphones, tablets, etc.).

Preferably and advantageously a user of said illumination system 100 can interact with said first command interfaces 80A and/or second command interfaces 80B at will.

In case the user interacts with said second command interface 80B, the command which could be for example the lights lighting, is transmitted to the central control unit 81 that, after having processed it, transmits the command again to said second command interface 80B, that will transmit it to the illumination devices 1 involved.

In case the user interacts with said first command interface 80A, the command will be transmitted to said second command interface 80B, following then the above-mentioned path.

In the same way, the first command interface 80A might receive data, relating the functioning and the status of said illumination system 100 from said second command interface 80B, which receives them from the central control unit 81.

Advantageously the first command interface 80A may receive said data directly from the central control unit 81.

Said central control unit 81 can be connected to internet, therefore allowing the user to control remotely (from the outside) the illumination system 100, also transmitting uniformly access to internet.

Advantageously said illumination device 1 is suitable for carrying out several functions, like for example travelling a path defined by the user or turning on and off the light basing on a timer.

This can be done by illumination device 1 through the components that compose the illumination system 100 i.e. said command interfaces 80A and 80B and said central control unit 81.

Said illumination device 1 can be also provided with one or more light sensors (not shown in the Figures), suitable for measuring the ambient light intensity around them, transmitting such information to said electronic board 9 that will transmit it to command interfaces 80 and to the central control unit 81.

Advantageously, with an illumination system 100 comprising a plurality of illumination devices 1, these devices will be able to homogenise the light intensity within the ambience, positioning themselves in the most convenient configuration relating to the information processed by the system.

Such innovation turns out to be extremely relevant taking into consideration the purpose of a continuous improvement of the ambience around humans. It is in fact known how light intensity can affect human psyche as well as his eyesight.

An inadequate or erroneous lighting system within a workplace can cause for example visual impairments. To this day it is hard to adjust rapidly the illumination intensity throughout the day.

Thanks to an illumination system 100, this adjustment can be carried out without any interaction by the users, calibrating automatically light parameters throughout the day basing on the parameters set initially.

Advantageously, illumination device 1 can comprise at least one gesture and movements recognition sensor, in such a way that it can be moved from one point to another of the support surface pointing the command interface toward the direction where the illumination device stands and then moving it toward the direction where the user desires to move the illumination device, or more generally through gesture recognition systems.

Advantageously, thanks to the conformation of illumination system 100, which is uniformly distributed all over the location, the illumination device 1 can be equipped with a vibration sensor suitable for recognizing an upcoming earthquake, a smoke detector suitable for detecting smoke in the location and an acoustic alarm suitable for warning users in the above-mentioned cases.

Moreover, said illumination device 1 can be equipped with speakers, suitable for spreading sounds and music, one or more cameras, suitable for recording video and even acting as CCVV.

Additionally said illumination device 1 can be equipped with gainful means to measure the quality of the environment where the user lives, such as a temperature sensor and an air-quality sensor.

Evidently all the alarms, warnings and information related to the above-mentioned sensors can be displayed on the command interface 80A and 80B, also remotely.

The system generates consistent benefits to the construction and architecture industries revolutionising the current concept of residential, civilian, industrial illumination.

Thanks to an illumination system 100, lighting becomes a user's servant, with considerable energy saving and generating, at the same time, significant improvements in art and architecture.

In fact several software, connected to the illumination system 100, control its functions and functioning, setting it with several configurations: the user is, in fact, able to save infinite "standard" positions, studied according to his specific needs and the location characteristics.

Said configurations can be activated through a rapid and easy command in every moment and, above all, they can activate autonomously according to specific hours, days, weeks, months and seasons, being also able to receive information relating to sunset time, sunrise time and weather situations from the internet, basing on geo-localisation.

In addition to receiving information relating to the ambience, the illumination device 1 can receive information related to the user and to his bodily functions.

Said information can be sent to the illumination device 1 by devices and software applications like smart wellness bracelets, processing the data and transforming them in commands or actions for example lighting, switching off, movement, dimmerization of the light sources.

Thanks to extremely creative and artistic software conformations, illumination devices 1 will be able to recreate constellations and in general astronomic compositions on the location surfaces, recreating outdoor environments within an indoor location.

They will be able to move autonomously over time restaging on the surface the same and effective movements of elements like for example stars and constellations.

Illumination devices 1 will be able to recreate figures and words.

Moreover, they can be set in such a way that they can follow a specific person within a location.

Positioning for example the powering station next to the entry door, the illumination device 1 will activate when the person gets into the location possibly with a specific communication device.

Thereafter the user can be followed by the illumination device during all of his activities within the location, with no need to turning on, turning off or dimmering lights.

An illumination system 100 installed in a civilian building, can for example replace the current lighting system installed in the theatres, currently commanded and controlled by dedicated professionals and being movable only along limited paths, usually determined by the extension of heavy steel frameworks.

An illumination system 100, positioned on a theatre stage and conveniently set basing on the specific needs, can move autonomously following the protagonists of the exhibition.

Hereinafter an example is described, of a possible use of an illumination system 100 by a user within his bedroom.

An illumination device 1 will follow the user within the bedroom during the whole process of night-preparation before the rest.

When he will lie down, the illumination device 1 will also follow him moving from the ceiling to the side wall, going next to the user.

Before the rest, the illumination device 1 might move to another area of the side walls, for example next to the bedroom door, reducing the light intensity.

Such configuration can be useful as a night light.

In case the user falls asleep forgetting to turn off the light, a possible bodily-functions-monitoring-system i.e. a smart wellness bracelet or a smartphone app, will be automatically able to communicate to the illumination device 1 commands like turning on, off, movement or dimmer of light source 3 of illumination device 1.

In fact, the command interface of said illumination device 1 is suitable for interacting operatively with processing and command software, implemented or implementable on every remote command device.

One more gainful characteristic of an illumination system 100 is that said illumination devices 1 can freely move also on the floor; the system 100 can also comprise one or more levitation bases 70 that can be freely positioned simply placing them on every point of the floor or on any other horizontal surface that does not need magnetic attraction, for example a piece of furniture.

The levitation base 70 can be visible or even hidden by elements like carpets.

The levitation base is equipped with an electromagnet that is activated through sensors or under command.

When the illumination device 1 will be on the levitation base 70, the electromagnet will generate an opposite force respect the force generated by the magnet 4, mounted inside the illumination device 1, allowing the illumination device 1 to levitate over the base.

In this way it is possible to change in one more way the lighting configuration of the ambience, in this case through light beams from the bottom directed to the top.

Advantageously, the sensors arranged in said illumination device 1 can be inserted, disabled, activated, deactivated, mounted and dismantled basing on the movement configuration chosen, potentially this can be done also remotely and/or automatically.

It is noted that said electronic board 9, advantageously integrated inside every illumination device 1 of said illumination system 100, allows controlling the motors 5B that activate the movement of powered rolling means 5A, which allow moving said illumination device 1; moreover, the electronic board 9, communicating with said sensors 8, can detect immediately the position of each illumination device 1, avoiding collisions between them and/or with possible obstacles across their movement trajectory.

Moreover, advantageously, said electronic board 9 are connected to magnetic sensors 12 and to magnet attraction force sensor 13, in order to manage optimally the force of the magnet, ensuring the reliability of the system 100.

Preferably, the electronic board 9 also manages the charging activities of the batteries 6, therefore also the possible return of the illumination devices 1 to the powering stations when it is reached the charge limit.

Said electronic board 9 also manages the light sources 3 functions i.e. the switching on, off and all the possible configurations like the dimmerization or the inclination, thanks to its communication with the command interfaces.

Potentially, said electronic board 9 can be connected to accelerometers or other electronic devices in order to carry out specific functions.

Figure 10:
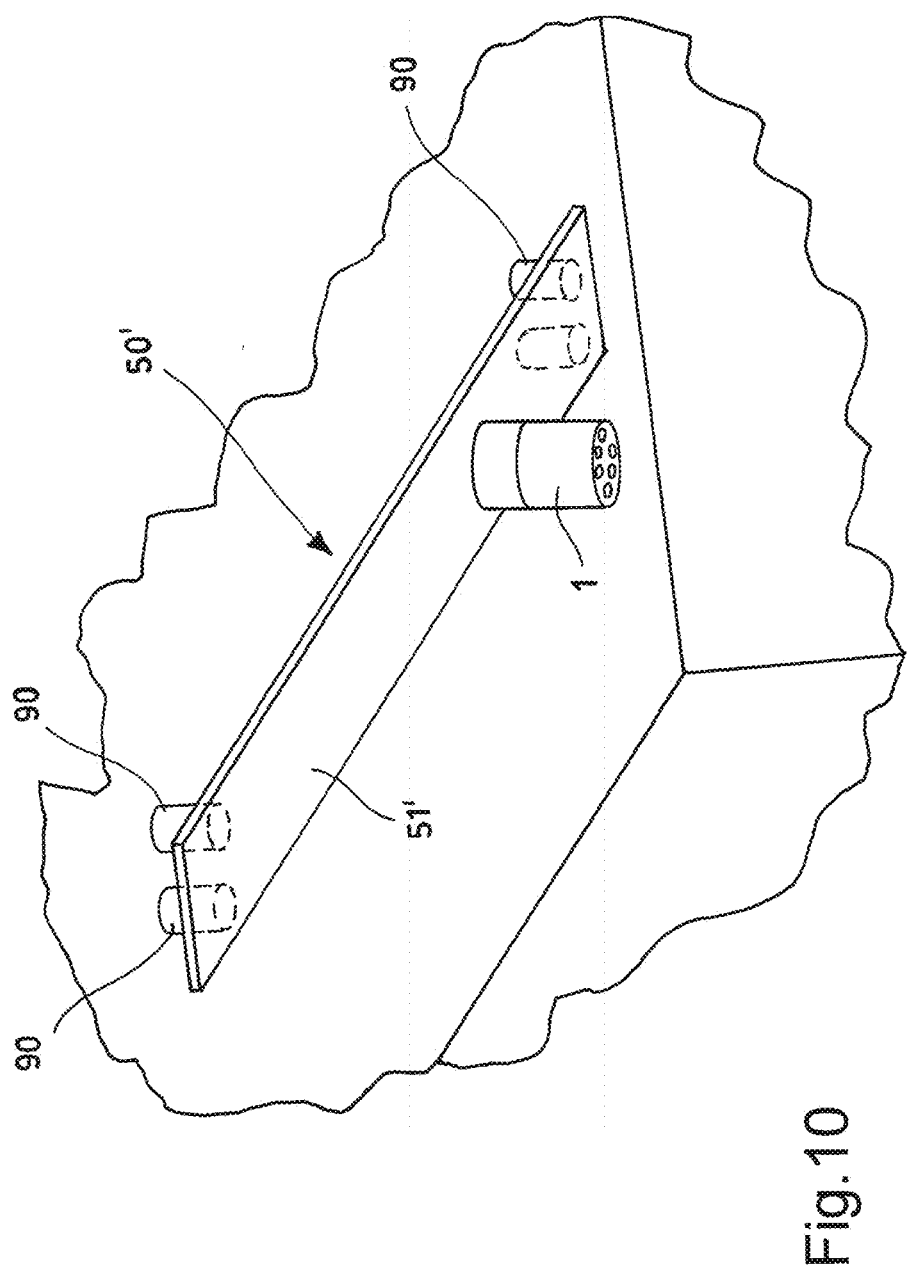
FIG. 10 shows an illuminating system according to a fifth embodiment of the invention.
Figure 11:
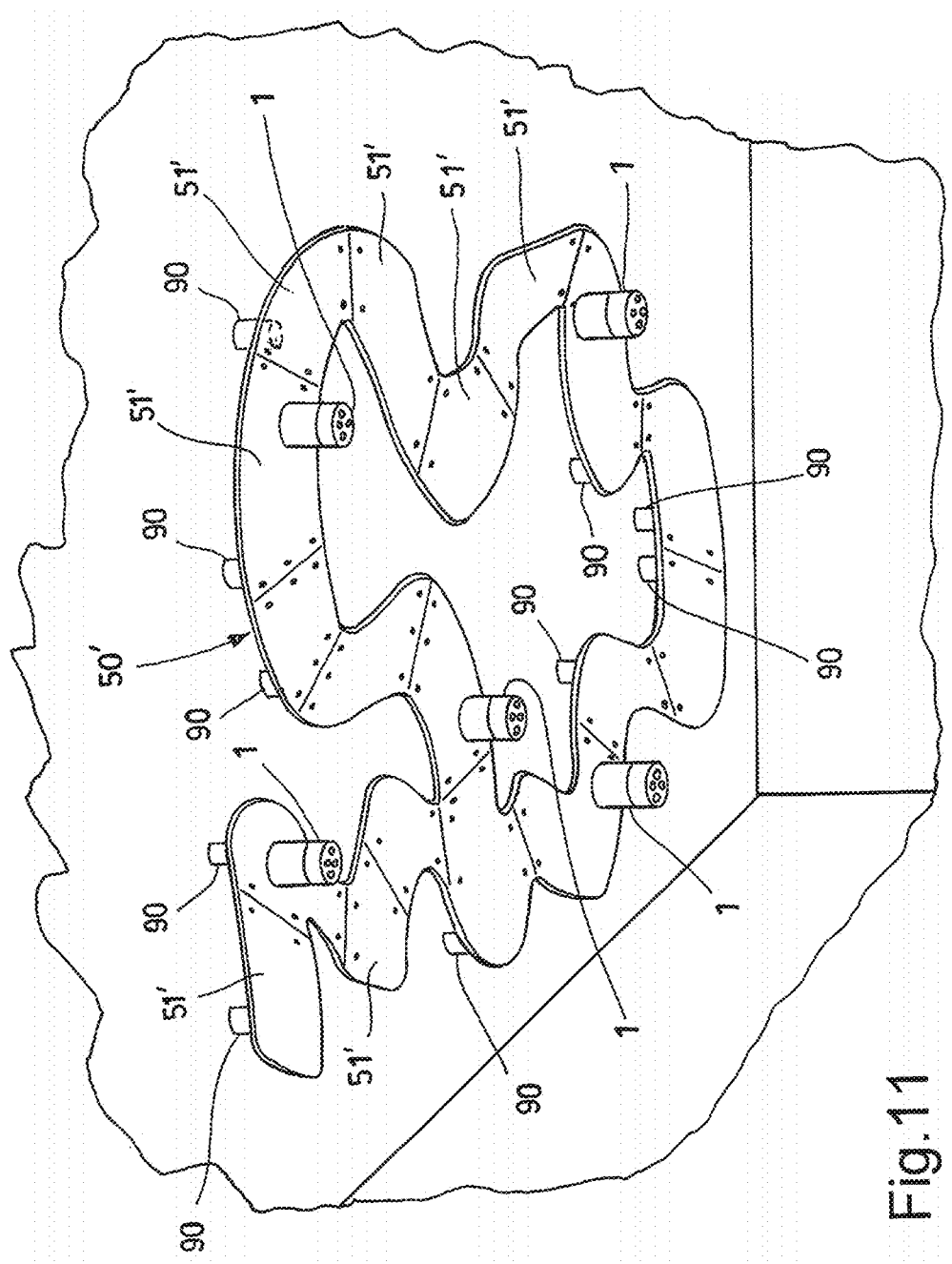
FIG. 11 shows an illuminating system according to a sixth embodiment of the invention.

As shown in FIGS. 10, 11, in a particular embodiment of the invention, the support structure 50' can form one or more tracks along which one or more illumination devices 1 can move.

To this purpose the support structure 50' can comprise one or more ferromagnetic support panels 51'.

Each support panel 51' comprise one or more layers of ferromagnetic materials which can be a metal sheet, a metal grid or a plurality of particles or bodies such as powder, chips, wires, rods arranged for example in a layer.

The support panel or panels 51' can be arranged so as to form an open or closed track, such as a loop track.

The support panel or panels 51' can be arranged so as to form a single branch track such as in FIG. 10, or a multiple branch track such as in FIG. 11.

Each support panel 51' can comprise a simple metal plate on which one or more illumination devices 1 run.

Advantageously the support panels 51' are assembled flush one to another so as to form a smooth surface and allowing an illumination device to pass smoothly from a panel 51' to an adjacent one.

Each support panel 51' can be fastened to the walls and/or a ceiling of a building and possibly spaced from it through suitable spacers 90.

For example the spacers 90 can set the respective support panel 51' at a distance comprised between 0.5-20 centimeters, or between 1-10 centimeters or 2-6 centimeters.

The support panels 51' can advantageously form a modular system allowing to assemble tracks of a great number of shapes and paths, and/or can be easily disassembled and reassembled.

Alternatively the support panels 51' and the support structure 50' can be hung to a ceiling through cables or chains.

In addition to perform their technical function, the support panels 51' can have a decorative function and be easily provided with a great variety of nice aesthetical appearance.

As previously described illumination device 1 is therefore projected in order to be used with any kind of system without being necessarily modified.

It can potentially function with or without magnetism, through different kinds of guide tracks and on several surfaces.

Thanks to that, the illumination device 1 is extremely adaptable and repositionable, being therefore a smart object that can interact with different systems, different themes, spaces, being also controllable by different users, with the possibility to rearrange it and reuse it.

The user that might need to move house will be easily able to remove the illumination devices 1 in few minutes with no need to unscrew them or disconnect cables.

He will be even able to move all the devices 1 or just some of them from house to the office in less then one minute.

Figuratively speaking, the illumination device 1 can be a personal belonging easily transportable from house to the office and even during camping.

It is noted the ease of inter-changeability of the light source 3, thanks to the inserting system as well as for the fact that at any time that the illumination device might need maintenance, including the replacement of the light source 3, it will be able to reach automatically an area easy accessible by the user.

Such characteristic of the system 100 in accordance with the present invention is particularly advantageous for those who have physical disabilities.

Disclosing another example of use of the illumination system 100, in another application, said system constitutes a concrete response to the need of showrooms for example shops of reconfiguring continuously the products exhibition, repositioning all the illumination devices on windows, shelves and other elements.

Evidently, the present invention can be subjected to several applications, modifications or variations without leaving the area of protection, as defined in the following claims.

For example, the driving means 5 can be not only wheels but also for example mechanical legs, tentacles, caterpillars, the stator or rotor of an electric linear motor or a magnetic levitation system.

Spherical bearings 7 can be replaced with or used in combination with sliding blocks or friction pads.

Each of the abovementioned light source 3 can be not only a light emitting diode (LED or OLED) but also for example an incandescent light bulb, a halogen lamp, fluorescent lamp, discharge lamp, ultraviolet or infrared lamp.

In a particular embodiment of the invention, said at least one illumination device (1) is provided with driving means (5) allowing the illumination device (1) to move for example across a surface or along cables or guides, and the driving means comprise one or more of the following elements: a mechanical leg, a tentacle, a caterpillar, a stator or rotor of an electric linear motor, a magnetic levitation system.

The wireless powering station 57 can be arranged for supplying electrical power to an illumination device 1 not only through a contactless inductive system but also for example through a capacitive contactless system; to this regard the inductor 57C can be replaced by a suitable capacitor suitable for transferring electrical power to the devices 1 with no contact.

Furthermore, the materials and the tools used for realizing the present invention as well as the shapes and dimensions of the single components, might be the most appropriate depending on the specific needs.

A wording such as "A comprises B, C, D" or "A is formed by B, C, D" discloses and encompasses also the particular case, in which "A consists of D, C, D".

The wording "A comprises an element B", unless differently specified, is to be understood "A comprises one or more elements B".

Examples and lists of possible alternatives, versions and modifications are to be understood as non-exhaustive lists.

The invention claimed is:

1. An illumination system (100) comprising at least one illumination device (1) comprising:
   a casing (2) wherein at least one light source (3) suitable for illuminating is housed,
   at least one power receptor (10);
   at least one electronic board (9) adapted to receive process and transmit data,
   said illumination system (100) also comprising at least one command interface (80A, 80B) adapted to communicate with said electronic board (9) of said at least one illumination device (1);
   wherein said at least one light source (3) emits an overall luminous flux equal to or greater than 400 lumen;
   wherein said at least one illumination device (1) is equipped with at least a pair of rolling elements (5A), powered by said at least one power receptor (10), controlled by said at least one electronic board (9) and managed by said at least one command interface (80A, 80B);
   wherein said illumination device (1) further comprises at least one magnet (4) housed inside said casing (2), and further comprising a support structure (50) comprising at least one support panel (51) defining a support surface and incorporating at least one ferromagnetic element (54).

2. The illumination system (100) according to claim 1 wherein said at least one light source (3) or the whole of said light sources (3) of one and the same said illumination device (1) emit an overall luminous flux equal to or greater than 30 lumen.

3. The illumination system (100) according to claim 1 wherein said pair of powered rolling elements (5A) are arranged such that their rotation centers lie along a same axis or along axes lying parallel to each other.

4. The illumination system (100) according to claim 1, wherein said support panel (51) comprises at least a first cardboard layer (52), a first structural plaster layer (53), said ferromagnetic element (54) comprising a flat foil, a second structural plaster layer (55) and a second cardboard layer (56).

5. The illumination system (100) according to claim 1, wherein said support panel (51) comprises at least a first plasterboard layer (58B) and said ferromagnetic element (54) comprising a flat foil, and a second plasterboard layer (58B).

6. The illumination system (100) according to claim 1, wherein said support panel (51) includes a mixture incorporating a plurality of ferromagnetic elements (54).

7. The illumination system (100) according to claim 1, comprising at least one powering station (59) comprising a plurality of powering contacts (59A) adapted to cooperate with said at least one power receptor (10) arranged on said at least one illumination device (1).

8. The illumination system (100) according to claim 1, comprising at least one powering station (57) arranged in said support panel (51), the at least one powering station comprising at least one power inductor (57C) adapted to cooperate with said at least one power receptor (10) of said illumination device (1) and a second electronic board (57B) operatively connected to said power inductor (57C).

9. The illumination system (100) according to claim 8, wherein a ferrite layer is arranged between said power inductor (57C) and said ferromagnetic element (54) of said panel (51).

10. The illumination system (100) according to claim 1, wherein said support structure (50) further comprises at least one connecting member (60) provided with a shaped surface made comprising ferromagnetic material, adapted to be arranged so as to allow the passage of said at least one illumination device (1) between mutually inclined support surfaces.

11. The illumination system (100) according to claim 1, further comprising a second support structure (30) provided with support means (33) comprising at least a pair of parallel support cables adapted to pass through said casing (2) engaging the outer surface of said pair of powered rolling elements (5A) to allow the movement of said illumination device (1) along the extension of said cables (33).

12. The illumination system (100) according to claim 11, wherein the respective opposite hands of said pair of support cables (33) are connected to guiding means comprising a pair of guiding cables (31) each being closed in a loop on itself, each one engaged between at least a powered driving pulley (32A) and an idle pulley (32B).

13. The illumination system (100) according to claim 1, further comprising a third support structure (40) provided with accompanying means (44) sliding along a pair of guide track (45), said accompanying means (44) being operatively associated with said powered rolling elements (5A) by means of support and transmission means (41, 42, 43).

14. The illumination system (100) according to claim 11 wherein said pair of powered rolling elements (5A) is adapted to transfer power at least to said electronic board (9) through said support means and/or said guiding means (31, 33, 41, 42, 43) of said support structure (30, 40), said support means and/or guiding means (31, 33, 41, 42, 43) being obtained with conductive materials.

15. The illumination system (100) according to claim 1, wherein said command interface (80A, 80B) is adapted to operatively interact with said electronic board (9) of said illumination device (1) by means of a central control unit (81).

16. The illumination system (100) according to claim 1, wherein said command interface (80B) comprises one or more of the following devices: a repeater Wi-Fi (82), a repeater Bluetooth, Zigbee, Wibree, a wireless repeater in general, a wireless transceiver (82), a wireless receiver and/or emitter.

17. The illumination system (100) comprising at least one illumination device (1) comprising:
- a casing (2) wherein at least one light source (3) suitable for illuminating is housed,
- at least one power receptor (10);
- at least one electronic board (9) adapted to receive, process and transmit data, said illumination system (100) also comprising at least one command interface (80A, 80B) adapted to communicate with said electronic board (9) of said at least one illumination device (1);
- wherein said at least one illumination device (1) is equipped with at least a pair of rolling elements (5A), powered by said at least one power receptor (10), controlled by said at least one electronic board (9) and managed by said at least one command interface (80A, 80B);
- wherein said illumination device (1) further comprises at least one magnet (4) housed inside said casing (2), and further comprising a support structure (50) comprising at least one support panel (51) defining a support surface and incorporating at least one ferromagnetic element (54);
- wherein said support panel (51) comprises at least a first cardboard layer (52), a first structural plaster layer (53), said ferromagnetic element (54) comprising a flat foil, a second structural plaster layer (55) and a second cardboard layer (56).

18. The illumination system (100) comprising at least one illumination device (1) comprising:
- a casing (2) wherein at least one light source (3) suitable for illuminating is housed,
- at least one power receptor (10);
- at least one electronic board (9) adapted to receive, process and transmit data, said illumination system (100) also comprising at least one command interface (80A, 80B) adapted to communicate with said electronic board (9) of said at least one illumination device (1);
- wherein said at least one illumination device (1) is equipped with at least a pair of rolling elements (5A), powered by said at least one power receptor (10), controlled by said at least one electronic board (9) and managed by said at least one command interface (80A, 80B);
- wherein said illumination device (1) further comprises at least one magnet (4) housed inside said casing (2), and further comprising a support structure (50) comprising at least one support panel (51) defining a support surface and incorporating at least one ferromagnetic element (54);
- wherein said support panel (51) comprises at least a first plasterboard layer (58B), said ferromagnetic element (54) comprises a flat foil, and a second plasterboard layer (58B).

* * * * *